US009158426B1

(12) United States Patent
Woodhull et al.

(10) Patent No.: US 9,158,426 B1
(45) Date of Patent: Oct. 13, 2015

(54) TOUCH KEYBOARD CALIBRATION

(71) Applicant: GOOGLE INC., Mountain View, CA (US)

(72) Inventors: Charles Woodhull, San Francisco, CA (US); James Tanner, Los Gatos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/219,921

(22) Filed: Mar. 19, 2014

(51) Int. Cl.
*G06F 3/02* (2006.01)
*G09G 5/00* (2006.01)
*G06F 3/045* (2006.01)

(52) U.S. Cl.
CPC ..................... *G06F 3/045* (2013.01)

(58) Field of Classification Search
CPC .... G06F 3/0202; G06F 3/0219; G06F 3/0213
USPC .............................. 345/169–179; 341/21–23; 361/679.1–679.19
See application file for complete search history.

(56) References Cited

U.S. PATENT DOCUMENTS

| | | | |
|---|---|---|---|
| 8,051,468 B2 | 11/2011 | Davis et al. | |
| 8,339,374 B2 | 12/2012 | Chang et al. | |
| 8,452,978 B2 | 5/2013 | Alward et al. | |
| 8,487,897 B1 | 7/2013 | Hsieh | |
| 8,982,160 B2 * | 3/2015 | Yee et al. | 345/661 |
| 2008/0309622 A1 * | 12/2008 | Krah | 345/173 |
| 2010/0220064 A1 | 9/2010 | Griffin et al. | |
| 2010/0225443 A1 | 9/2010 | Bayram et al. | |
| 2011/0275412 A1 * | 11/2011 | Khawand | 455/566 |
| 2012/0050229 A1 * | 3/2012 | Tenuta et al. | 345/178 |
| 2012/0075194 A1 * | 3/2012 | Ferren | 345/168 |
| 2012/0268376 A1 | 10/2012 | Bi et al. | |
| 2013/0106709 A1 | 5/2013 | Simmons | |
| 2013/0222315 A1 | 8/2013 | Zhai et al. | |
| 2013/0288647 A1 | 10/2013 | Turgeman et al. | |
| 2014/0160085 A1 * | 6/2014 | Rabii et al. | 345/178 |
| 2014/0204059 A1 * | 7/2014 | Geaghan | 345/174 |

FOREIGN PATENT DOCUMENTS

| | | |
|---|---|---|
| EP | 2261786 A2 | 12/2010 |
| EP | 2033081 B1 | 11/2012 |
| KR | 20120047973 A | 5/2012 |

OTHER PUBLICATIONS

International Search Report for PCT Application No. PCT/US2015/020772, mailed May 29, 2015, 13 pages.

* cited by examiner

*Primary Examiner* — Kimnhung Nguyen
(74) *Attorney, Agent, or Firm* — Brake Hughes Bellermann LLP (57) ABSTRACT

A non-transitory computer-readable storage medium may comprise instructions stored thereon. When executed by at least one processor, the instructions may be configured to cause a computing system to at least display keys on a touch keyboard, display a prompt to type into the touch keyboard, store locations and pressures of calibration inputs onto the keys on the touch keyboard in association with an account, and recognize subsequent inputs into the touch keyboard during a session with the account based on the stored locations and pressures.

20 Claims, 9 Drawing Sheets

TOUCH KEYBOARD CALIBRATION

TECHNICAL FIELD

This description relates to touch keyboards.

BACKGROUND

Touch keyboards may display keys on a screen or display, and may detect contact with the screen or display by a user's fingers and/or hands. At times, the user may accidentally contact part of the screen or display.

SUMMARY

According to an example implementation, a non-transitory computer-readable storage medium may comprise instructions stored thereon. When executed by at least one processor, the instructions may be configured to cause a computing system to at least display keys on a touch keyboard, display a prompt to type into the touch keyboard, store locations and pressures of calibration inputs onto the keys on the touch keyboard in association with an account, and recognize subsequent inputs into the touch keyboard during a session with the account based on the stored locations and pressures.

According to an example implementation, a non-transitory computer-readable storage medium may comprise instructions stored thereon. When executed by at least one processor, the instructions may be configured to cause a computing system to at least authenticate a login associated with an account, display keys on a touch keyboard, the touch keyboard comprising a flat display and being configured to detect locations and pressures of contacts onto the flat display, display text on a display for a user of the account to type into the touch keyboard, store locations and pressures of contacts onto the touch keyboard for expected inputs, the expected inputs being based on the displayed text, determine minimum pressure thresholds and locations for multiple characters, the minimum pressure thresholds and locations being based on the stored locations and pressures, compare, during a session with the account, at least a first input from the touch keyboard to a first pressure threshold associated with a first character and a second input from the touch keyboard to a second pressure threshold associated with a second character, recognize the first character based on the first input meeting the first pressure threshold, and ignore the second input based on the second input not meeting the second pressure threshold.

According to an example implementation, a computing device may include a touch screen configured to display text and receive touch inputs, at least one processor, and a non-transitory computer-readable storage medium comprising instructions stored thereon. When executed by at least one processor, the instructions may be configured to cause the computing device to at least display keys on the touch screen, display a prompt to type into the touch screen, store locations and pressures of inputs onto the keys on the touch screen, and recognize subsequent inputs into the touch screen based on the stored locations and pressures.

According to an example implementation, a computing device may include means for displaying keys, means for displaying a prompt to type into the means for displaying keys, means for storing locations and pressures of inputs onto the keys on the means for displaying keys, and means for recognizing subsequent inputs into the means for displaying keys based on the stored locations and pressures.

The details of one or more implementations are set forth in the accompanying drawings and the description below. Other features will be apparent from the description and drawings, and from the claims.

DETAILED DESCRIPTION

Figure 1A:
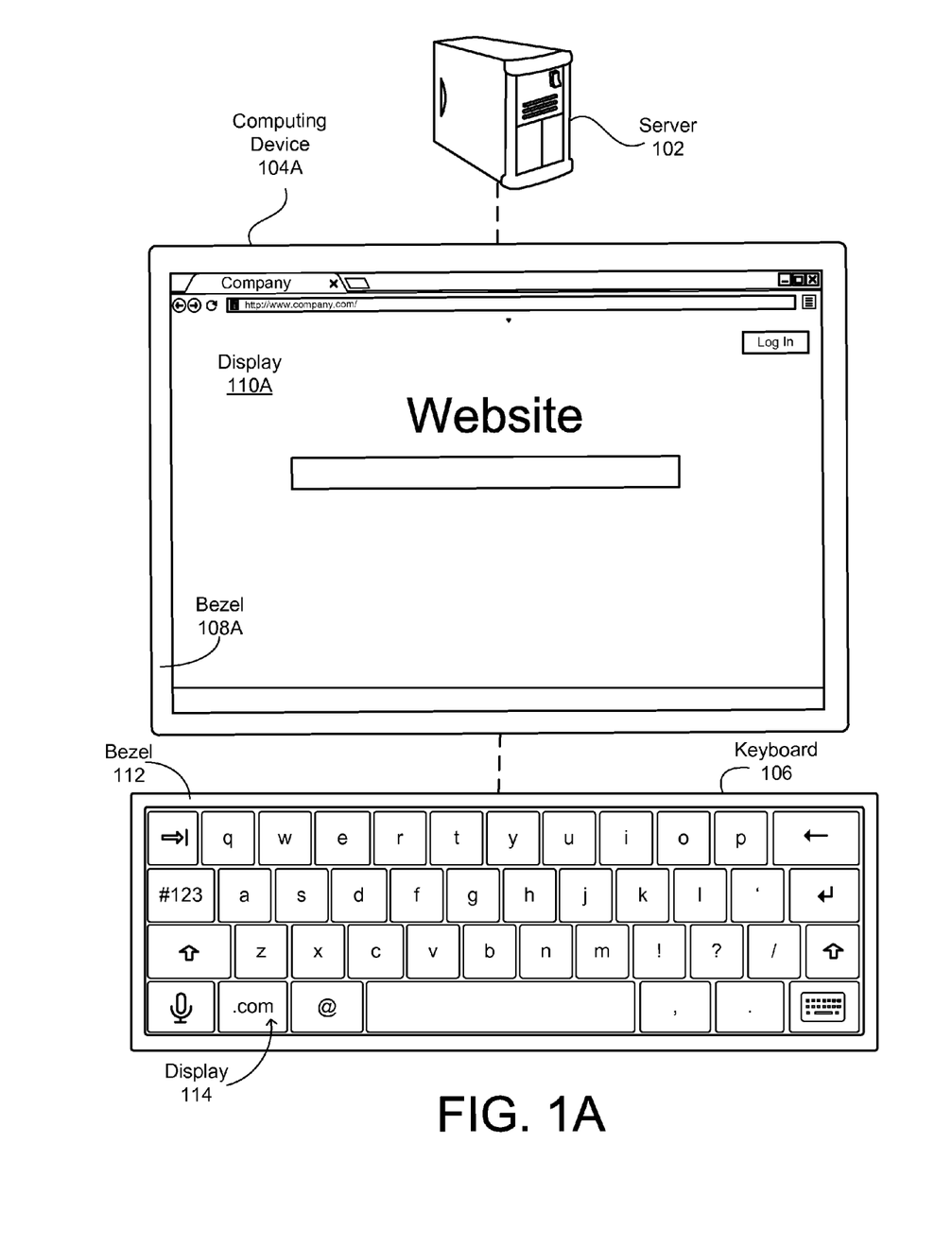
FIG. 1A shows a server, a computing device, and a touch keyboard according to an example implementation.

FIG. 1A shows a server 102, a computing device 104A, and a touch keyboard 106 according to an example implementation. The touch keyboard 106 may display keys and detect a location of a contact(s) and an amount(s) of force or pressure with which a user presses and/or types onto the displayed keys. The server 102 and/or computing device 104A may determine whether to recognize contacts as valid inputs based on the amount of force or pressure applied, and previous determinations of minimum or threshold amounts of force or pressure at various parts of the keyboard, to recognize a valid input.

A user may log into the server 102 via the computing device 104A, and the server 102 may recognize input from the user onto the touch keyboard 106 based on settings associated with the user's account. For example, the user may have previously calibrated his or her account and or settings for typing into the touch keyboard 106, and the server 102 may recognize or ignore inputs into the touch keyboard 106 based on the settings associated with the user's account. The settings, and/or determinations of whether to recognize or ignore input or contacts, may be stored on and/or performed by the server 102, the computing device 104A, or the touch keyboard 106, according to example implementations.

The server 102 may include a remote server that communicates with the computing device 104A via a network, such as the Internet. The server 102 may include a single server or multiple servers. The server 102 may provide remote computing services to computing devices including the computing device 104A, such as providing search results, email, word processing, or other productivity services. The remote computing services may be provided to the computing device 104A via a browser of the computing device 104A, and the browser may display output from within the computing device 104A.

The server 102 may, for example, receive and process information received from the computing device 104A (and other computing devices), and send image data to the computing device 104A prompting the computing device 104A to display images. The information received by the server 102 from the computing device 104A may be based on input received by the computing device 104A from the touch keyboard 106. For example, if the server 102 is providing word processing services to the computing device 104A, a user may type into the touch keyboard 106, the computing device 104A may receive input from the touch keyboard 106 such as alphanumeric keys and/or text, the computing device 104A may send the received input to the server 102, the server 102 may process the input, and the server 102 may send image data to the computing device 104A, prompting the computing device 104A to display the alphanumeric keys and/or text that the user inputted into the touch keyboard 106.

The computing device 104A may include a general purpose computing system, and may include any computing device capable of sending and receiving data to and from the server 102, displaying data to a user, and receiving input from a keyboard, such as the touch keyboard 106. The computing device 104A may include, for example, a tablet computing device, a laptop or desktop computer, or a smartphone. The computing device 104A may include a display 110A for presenting visual information to a user, and may include an interface for coupling to the touch keyboard 106. The interface to the touch keyboard 106 may be a wired interface, such as Universal Serial Bus (USB) or Ethernet, or may be wireless, such as IEEE 802.15 Bluetooth or IEEE 802.11 Wireless Fidelity (WiFi). The computing device 104A may include a bezel 108A surrounding the display 110A. The display 110A may present images to a user, which may be based on a combination of software stored in the computing device 104A and data received from the server 102.

The touch keyboard 106 may include a standalone touch keyboard, and may display keys and detect when the user contacts and/or presses the displayed keys. The touch keyboard 106 may include a bezel 112 surrounding a display 114. The display 114 may display keys. The keyboard 106 may also include a touch sensor for detecting where the user has touched the display 114 and provided input. The display 114 may be flat, enabling the touch keyboard 106 to be thinner than keyboards with physical keys. The touch keyboard 106 may detect an amount of force or pressure applied by the user to the display. The touch keyboard 106 may, for example, include resistive and/or capacitive elements and may detect changes in resistance and/or capacitance. The change in resistance and/or capacitance may indicate the location and force or pressure of the contacts.

In an example implementation, the touch keyboard 106 may not include the display 114. The touch keyboard 114 may, for example, include an image of a keyboard printed onto material such as fabric or plastic. The example touch keyboard 106 that does not include the display 114 may detect pressure and/or location of contacts, as described herein. In an example implementation, the touch keyboard 106 may not include and/or display any images of keys, and may include a trackpad, for example, that detects locations and pressures of contacts.

Figure 1B:
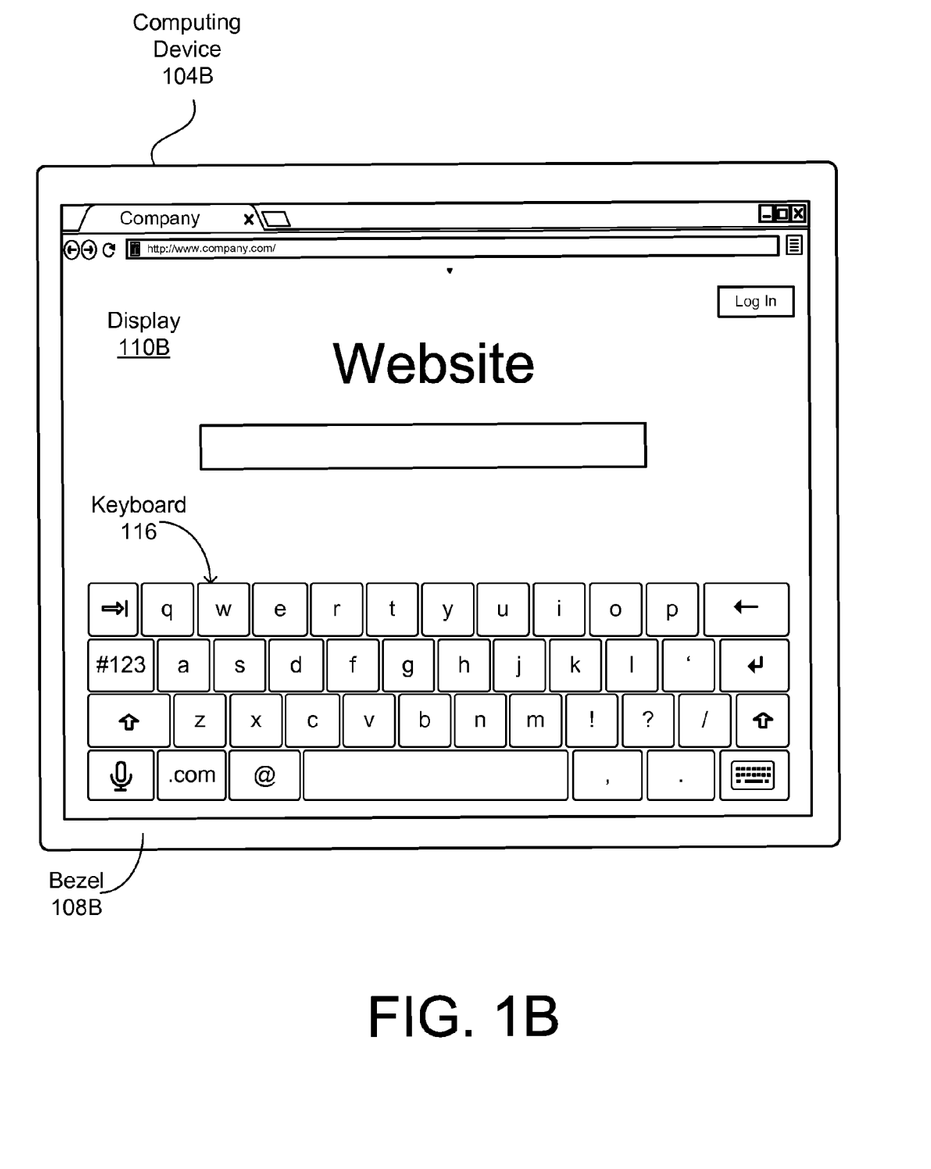
FIG. 1B shows a computing device according to another example implementation.

FIG. 1B shows a computing device 104B according to another example implementation. The computing device 104B may include any or all of the features and functionalities of the computing device 104A described herein. In this example, the display 110B, which may be surrounded by a bezel 108B and may include a touch screen, may display a keyboard 116. The computing device 104B may detect amounts of force or pressure applied by the user onto the keyboard 116 of the display 110B and locations of the force or pressure, in similar manner to the display 110A and/or touch keyboard 106 described herein.

Figure 1C:
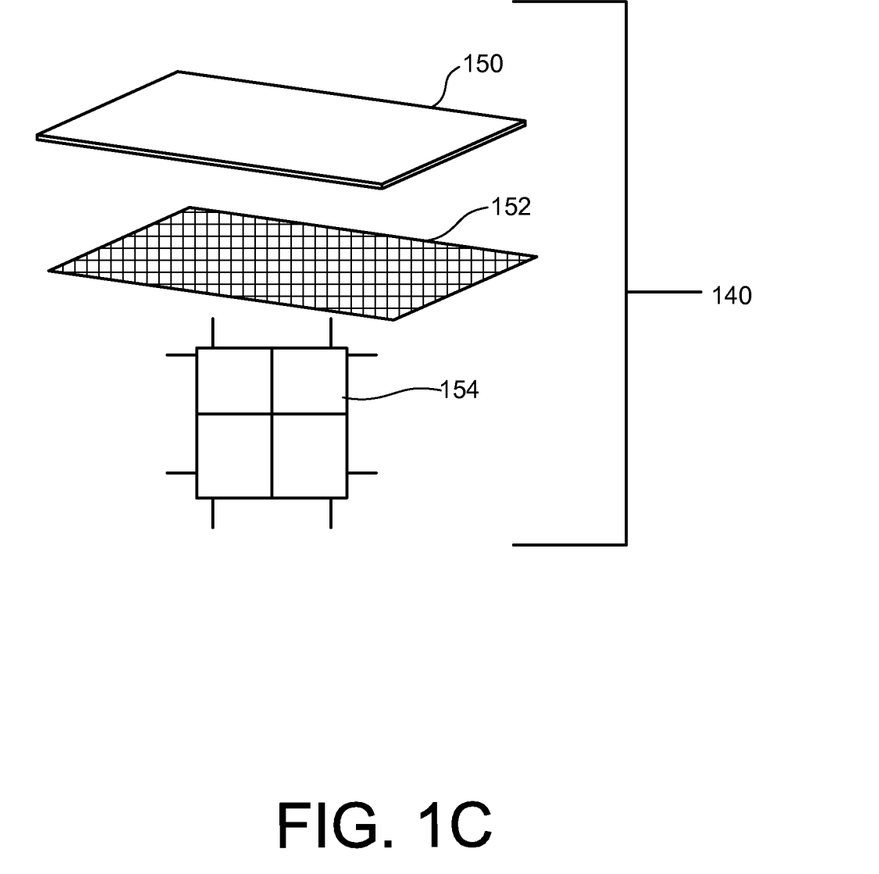
FIG. 1C is a diagram of a touch screen and related components according to an example implementation.

FIG. 1C is a diagram of a touch screen 140 and related components according to an example implementation. The touch screen 140 may be included in the display 110A of the computing device 104A, the display 114 of the touch keyboard 106, or the display 110B of the computing device 104B. The touch screen 140 may include a surface 150, a sensor 152, and a controller 154.

The surface 150 may be configured to be contacted by a user to actuate and trigger an electrical response within the touch screen 140. The surface 150 may, for example, be on top of the touch screen 140 (such as on the portion of the display 110A, 114, 110B closest to the user) and above the sensor 152. The surface 150 may be operably coupled to the sensor 152. The sensor 152 can be activated when a user enters an input (e.g., a touch or a tap), such as by applying pressure on the top surface 150 of the touch screen 140. The sensor 152 can be, for example, a flame-retardant class-4 (FR4) printed circuit board. The sensor 152 may be responsive to applications of pressure on the surface 150 and/or sensor 152, and may provide signals to a controller 154 indicating changes in resistance and/or capacitance in the sensor 152 based on the applications of pressure, and locations of the changes in resistance and/or capacitance.

The controller 154 may be operably coupled to the sensor 152. The controller 154 may be an embedded microcontroller chip and may include, for example, read-only firmware. The controller 154 may include a single integrated circuit containing a processor core, memory, and programmable input/output peripherals. The controller 154 may provide input to the computing device 104A, 104B and/or touch keyboard 106, such as the locations and force or pressure of contacts, or the force or pressure of contacts and the keys associated with the locations of the contacts.

Figure 1D:
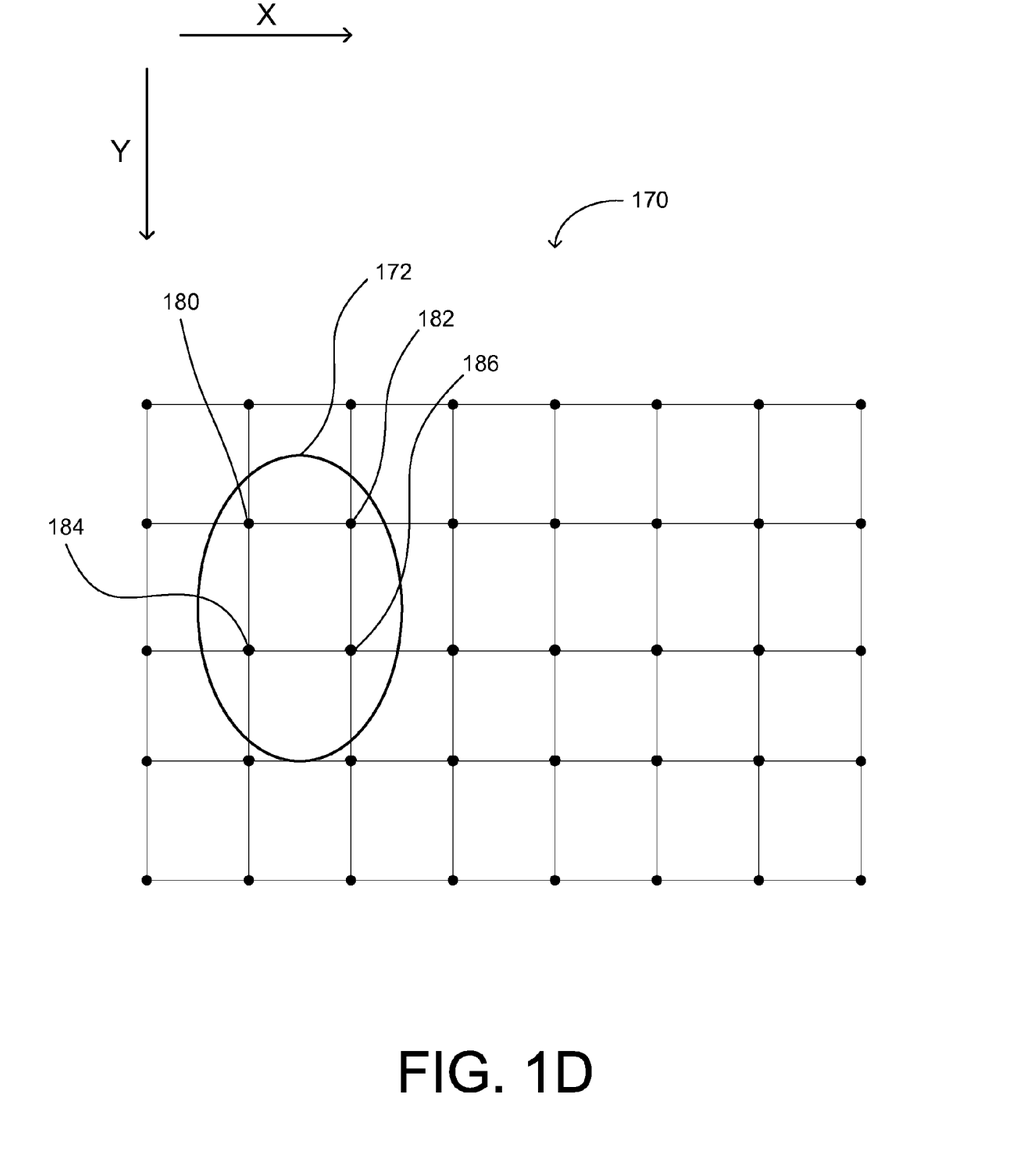
FIG. 1D is a diagram of a sensor grid according to an example implementation.

FIG. 1D is a diagram of a sensor grid 170 according to an example implementation. The sensor grid 170 may be included as part of the touch screen 140, such as part of sensor 152 shown in FIG. 1C. Other implementations are possible, and the specific depiction of sensor grid 170 shown in FIG. 1D is merely for illustration. For example, the grid 170 may have any number of columns and rows (rather the eight columns and five rows shown in the example of FIG. 1D), and may be formed in any shape. The sensor grid 170 may include any number sensors, such as sensors 180, 182, 184, 186. The sensors 180, 182, 184, 186 may be spaced any distance (such as a few millimeters) apart from each other and may be designed to sense tactile input. The sensors 180, 182, 184, 186 may sense tactile input by sensing applications of pressure to the surface 150 of the touch screen 140, such as by detecting or determining resistance and/or capacitance levels. The resistance and/or capacitance levels may be changed by the received tactile input, such as changes or applications of pressure to the surface 150 and/or sensor 152.

Input 172, which may be a fingerpad contact, represents a position on the grid 170 when a user places a finger on the tactile input device 110. As shown in FIG. 1D, input 172 may span multiple rows and columns of sensors 180, 182, 184, 186 on grid 170. The sensors 180, 182, 184, 186, and/or controller 154 may sense and/or determine an amount of pressure applied by the user's finger based on changes in the resistance and/or capacitance, and/or based on the number or area of sensors 180, 182, 184, 186 that detect the user's finger contacting the surface 150. The sensors 180, 182, 184, 186, and/or controller 154 may sense and/or determine a location of the contact input 172. In an example implementation, the location may be measured in both a horizontal or 'X' direction and a vertical or 'Y' direction. The location may map to a key on the display 114 of the touch keyboard 106 or keyboard 116 of the display 110B described above.

Figure 2:
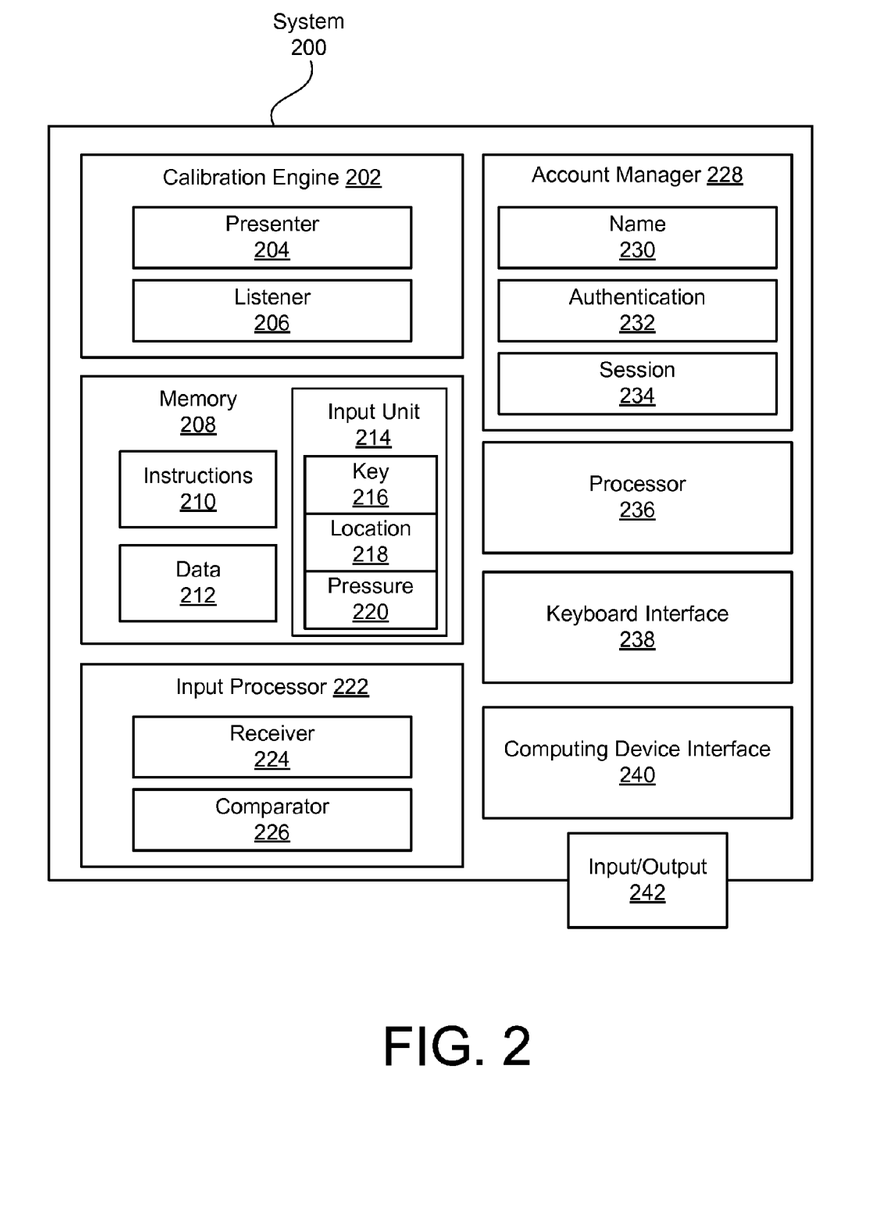
FIG. 2 is a diagram of a system according to an example implementation.

FIG. 2 is a diagram of a system 200 according to an example implementation. The system 200 may determine whether to recognize contacts, such as the input 172 shown and described above with respect to FIG. 1D, on the touch keyboard 106 as valid keyboard inputs. The system 200 may also determine whether to recognize contacts on the keyboard 116; while contacts will be described herein with respect to the touch keyboard 106, the functions and processes described herein may also be applied with respect to the keyboard 116. The functions and/or modules of the system 200 may be included in any combination of the server 102, the computing devices 104A, 104B, and/or the touch keyboard 106. The functions and/or modules may, for example be performed by the server 102 in a remote computing context in which the user logs into the server 102 via the computing device 104A, in a local computing context in which the user logs into the computing device 104B or in which the computing device 104B does not require login and stores the same settings for all users, or by the keyboard 106 in an example in which the keyboard 106 is calibrated for one or more users. The functions and/or modules may also be distributed between the server 102, computing device 104A, 104B, and/or keyboard 106. Any combination of the functions and/or modules described herein may also be included in or performed by touch DJ equipment, trackpads, mice, or smartphones.

The system 200 may determine whether to recognize contacts on the touch keyboard 106 as valid keyboard inputs based on locations of the contacts, amounts of force or pressure applied by the contacts to the touch keyboard 106, and previous determinations of minimums or thresholds of force or pressure required to recognize a valid contact at various locations on the touch keyboard 106. The minimums or thresholds of force or pressure may be different at different locations on the touch keyboard 106. For example, a first minimum or threshold of force or pressure at a location on the touch keyboard 106 where the space bar is displayed may be greater than a second minimum or threshold of force or pressure at one or more locations on the touch keyboard 106 where keys are displayed. In another example, the guide keys, 'a', 's', 'd', 'f', 'j', 'k,' 'l', and the apostrophe ('), at which users typically rest their fingers before beginning to type, may have greater or higher threshold than other keys on the keyboard, preventing the system 200 from recognizing inputs when the user is merely resting his or her fingers on the touch keyboard 106. The minimums or thresholds may also be different for different locations associated with the same key.

The system 200 may include a calibration engine 202. The calibration engine may calibrate the user's account to determine whether contacts on the touch keyboard 106 were intentional contacts intended as keystrokes, or accidental contacts that were not intended as keystrokes. The calibration engine 202 may prompt the user to type sample text, monitor the user typing the sample text, and determine pressure or force thresholds or minimums for various locations to recognize contacts as valid keystrokes and/or inputs. Calibration may be performed by the calibration engine 202 when the user sets up an account for using the touch keyboard 106, or at any time after the user sets up an account, and the settings, such as pressure or force thresholds and any location variances, may be accessed when the user later types into the touch keyboard 106.

The calibration engine 202 may determine force or pressure thresholds during a calibration process. The calibration engine 202 may include a presenter 204. The presenter 204 may cause a prompt to be displayed on the display of the computing device 104 during the calibration process. The prompt may, for example, include text for the user to type into the touch keyboard 106. The text shown on the display may change as the user types into the touch keyboard 106, allowing the user to type a significant amount of text into the touch keyboard 106 for calibration.

The calibration engine 202 may also include a listener 206. The listener 206 may detect contacts, such as input 172, onto the touch keyboard 106 during the calibration process. The listener may determine, for each contact, a determined key based on the prompted text and/or location of the contact on the touch keyboard 106, a location on the touch keyboard 106 of the contact, and a pressure or amount of force of the contact. The determined key may also be "none" or "null," if the system determines that no keystroke was intended, such as if the keystroke was inconsistent with the prompted text and/or the amount of force or pressure was low.

Figure 3:
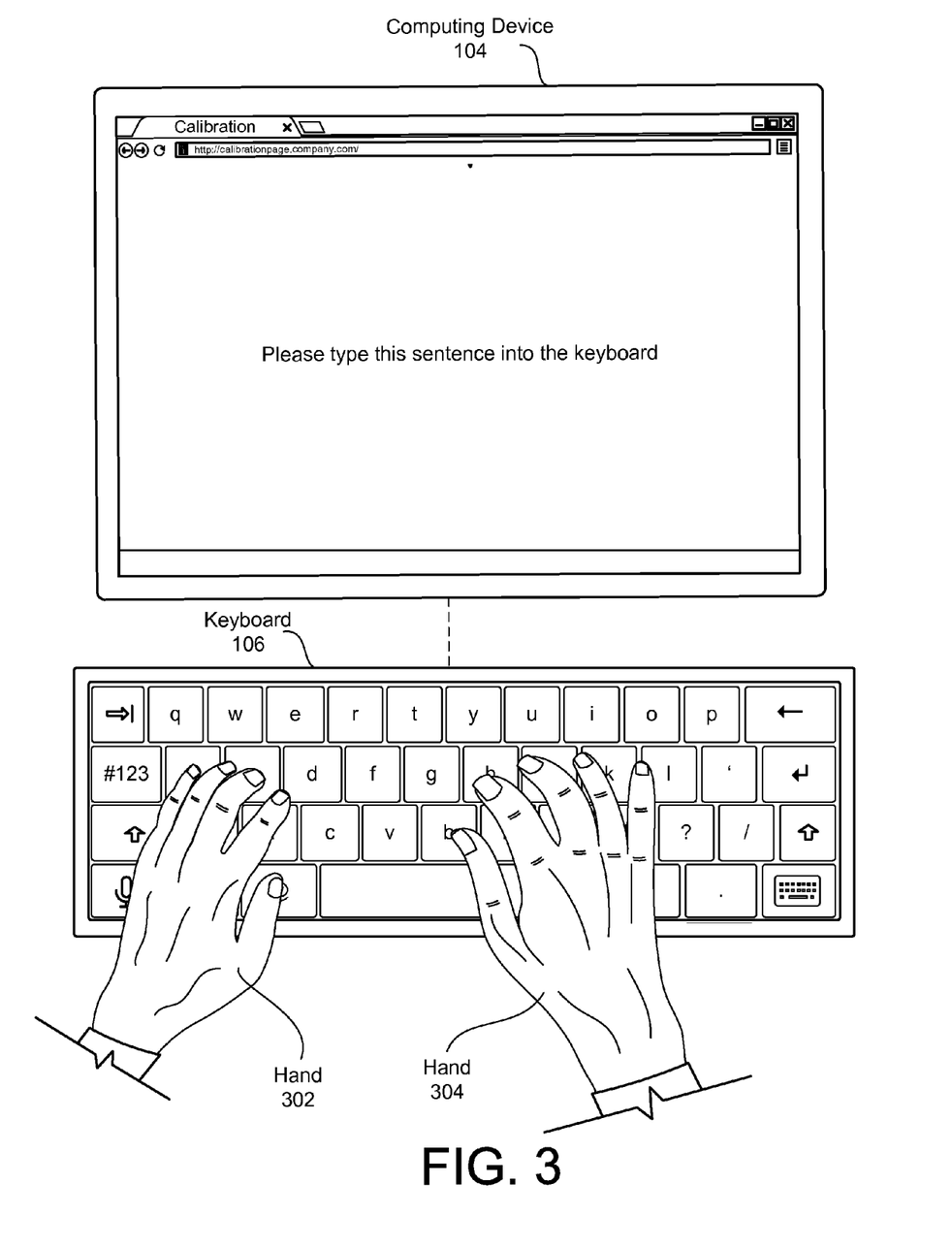
FIG. 3 shows the computing device, the touch keyboard, and a user typing onto the touch keyboard according to an example implementation.

FIG. 3 shows the computing device 104, the touch keyboard 106, and a user typing onto the touch keyboard 106 according to an example implementation. In this example, the presenter 204 may have instructed the display of the computing device to display the text, "Please type this sentence into the keyboard." The listener 206 may detect contacts, such as input 172, from the user's fingers and/or hands 302, 304 into the touch keyboard 106. The calibration engine 202 may recognize the characters in the text, "Please type this sentence into the keyboard," as expected input, and may associate sequential contacts with sequential characters in the text.

The calibration engine 202 may also determine locations for keys or characters. While most contacts while be inside the intended keys, some contacts may be outside or between keys. Different users may have different typing patterns. For example, a first user may contact the touch keyboard 106 between the 'o' and the 'p' when intending to type an 'o', whereas a second user may contact the touch keyboard 106 between the 'o' and the 'p' when intending to type a 'p'. The calibration engine 202 may store the location between the 'o' and the 'p' in association with the letter 'o' for the first user's account, and may store the location between the 'o' and the 'p' in association with the letter 'p' for the second user's account. The locations may, for example, include X and Y values with respect to a reference point, such as an upper-left corner of the touch keyboard 106, according to an example implementation.

In an example implementation, the calibration engine 202 may change the images of keys displayed by the display 114, 110B based on the user's typing patterns. The calibration engine may change the locations of images of keys based on the locations users contact when they intent to type specific keys. For example, if a user contacts the touch keyboard 106 between the 'o' and the 'p' when intending to type an 'o', the calibration engine 202 may move the 'o' and 'p' to the right, so that the 'o' is where the user contacts the touch keyboard 106 when the user is intending to type the 'o'. by moving the keys to the locations that the user contacts the keyboard 106 when intending to type the respective keys, the calibration engine 202 may generate a keyboard that conforms to the user's typing patterns and is easier for the user to type into.

In an example implementation, the calibration engine 202 may determine pressure thresholds during use, such as during a login session, in addition to or instead of, during a calibration process. For example, the calibration engine 302 may update the minimum force or pressure thresholds during a login session by a user, such as by lowering the force or pressure threshold if the user retypes or recontacts a key after the input processor 222 (described below) ignored a contact on the key, or may raise the force or pressure threshold if the user deletes a character that the input processor 222 recognized. The calibration engine 302 may also to adjust the thresholds over time by averaging new inputs with stored inputs, according to an example implementation.

Returning to FIG. 2, the system 200 may also include a memory 208. The memory 208 may store instructions 210 that, when executed by at least one processor, are configured to cause a computing system to perform any combination of the functions and processes described herein. The memory 208 may also store data 212. The data 212 may include both information that is related to the functions and processes described herein, and information that is not related to the functions and processes described herein.

The memory 208 may also store multiple input units 214. While only one input unit 214 is shown in FIG. 2, the memory 208 may store multiple input units 214. The calibration engine 202 may cause the memory 208 to store input units 214 based on contacts detected by the listener 206 during calibration. The memory 208 may, for example, store at least one input unit 214 for each key displayed by the touch keyboard 106. The memory 208 may, for example, store multiple input units 214 for each key displayed by the touch keyboard 106, with each input unit 214 corresponding to a location where the user may contact the touch keyboard 106 when intending to type the respective key. The location may include an X value and a Y value with respect to a reference point on the touch keyboard 106. In an example with multiple accounts, the memory 208 may store versions of these input units 214 for each account.

Each input unit 214 may be associated with, and/or include, a key 216, such as an alphanumeric key on the touch keyboard 106 and/or an American Standard Code for Information Interchange (ASCII) character or Unicode character. The input unit 214 may also include a location 218. The location 218 may be a detected location on the touch keyboard 106. The location 218 may, for example, correspond to a location on the touch keyboard 106, which may be represented by an X value and a Y value, in which the associated key 216 is displayed and/or where the user contacts the touch keyboard 106 intending to type the associated key 216. The input unit 214 may also include a pressure threshold 220. The pressure threshold 220 may indicate a minimum or threshold of pressure or force that must be detected at the location 218 associated with the input unit 214 for the associated key 214 to be recognized as a valid input during a given contact onto the touch keyboard 106. If the contact does not meet the pressure threshold 220, then no input from the touch keyboard may be recognized and/or the system 200 may ignore the contact.

The system 200 may include an input processor 222. The input processor 222 may process input from the touch keyboard 106, such as contacts, and determine which character, if any, to recognize.

The input processor 222 may include a receiver 224. The receiver 224 may receive inputs from the touch keyboard 106, such as contact inputs including an input 172. The receiver 224 may receive the input from, for example, the controller 154. The inputs may include locations of the contacts, which may include X values and Y values, and pressures of the contacts.

The input processor 222 may also include a comparator 226. The comparator 226 may compare the received inputs to the input units 214 stored in the memory 208. The comparator 226 may, for example, determine which, if any, input unit 214 includes the location 218 corresponding to the location on the touch keyboard 106 where the contact occurred. If no input unit 214 includes a location 218 corresponding to the location of the contact, then the input processor 222 may not recognize any input from the touch keyboard 106 and/or may ignore the contact. If an input unit 214 does include a location 218 corresponding to the location of the contact, then the comparator 226 may compare the pressure or force of the contact with the pressure threshold 220 included in the input unit 214. If the pressure or force of the contact meets or exceeds the pressure threshold 220, then the input processor 222 may recognize the input as the key 216 stored in the input unit. If the pressure or force of the contact does not meet or exceed the pressure threshold 220, then the input processor 222 may ignore the input and/or not recognize any input from the touch keyboard 106 based on the contact.

The system 200 may include an account manager 228. The account manager 228 may manage and/or store accounts for one or multiple users. The account manager 228 may, for example, store a name 230 and authentication 232 for each user. The name 230 may include a username associated with the user. The authentication 232 may include authentication, such as a password, biometric information, and/or address information associated with the name 230.

The account manager 228 may also include a session manager 234. The session manager 234 may manage logins, such as by requesting a name and authentication, to log a user in.

Once the user is logged in, the session manager 234 may associate the input units 214 associated with the account with the logged-in name with inputs and/or contacts received from the touch keyboard 106. The session manager 234 may, for example, cause the input processor 222 to compare received contacts to a first set of input units 214 that are associated with a first account during a session after the first account was logged in, and may cause the input processor 222 to compare received contacts to a second set of input units 214 that are associated with a second account during a session after the second account was logged in. The comparison to different sets of input units 214 may allow different users to use the same computing device 104 and/or touch keyboard 106 and have the system 200 respond to their respective calibrations. The session manager 234 may cause the input processor 222 to compare the received contacts to input units 214 associated with a given account even when the account is logged in via a different computing device 104 and/or touch keyboard 106, allowing a user to log in via different devices and type into a different touch keyboard with the same calibration settings.

According to an example implementation, the account manager 228 may recognize and authenticate a user and/or account based on typing patterns into the touch keyboard 106. For example, the memory 208 may have stored average intervals between keys and/or average pressures on keys for a given account. Rather than require a name and authentication, the account manager 228 may simply let a user begin typing and identify and authenticate the user based on typing patterns into the touch keyboard 106, such as intervals between keys and/or pressure on keys.

The system 200 may include one or more processors 236. The one or more processors 236 may include one or more microprocessors capable of executing instructions, such as the instructions 210 stored in the memory 208. The one or more processors 236 may implement modules or functionalities of the system 200, such as the calibration engine 202, input processor 222, account manager 228, keyboard interface 238, and/or computing device interface 240.

The system 200 may include a keyboard interface 238. The keyboard interface 238 may receive and/or send signals from and/or to the touch keyboard 106, such as from the controller 154. The keyboard interface 238 may, for example, receive contact inputs, including locations and pressures, from the touch keyboard 106, and pass the contact inputs to the input processor 222.

The system 200 may include a computing device interface 240. The computing device interface 240 may send and/or receive signals to and/or from the computing device 104A, 104B. The computing device interface 240 may, for example, receive contact inputs, and may send display signals for generating display output to the computing device 104A, 104B.

The system 200 may include an input/output module 242. The input/output module 242 may include a single module which receives input and sends output, or may include a first module that receives input and a second module that sends output. The input/output module(s) 242 may include one or multiple wired or wireless interfaces for communicating with the server 102, computing device 104A, 104B, and/or touch keyboard 106.

Figure 4:
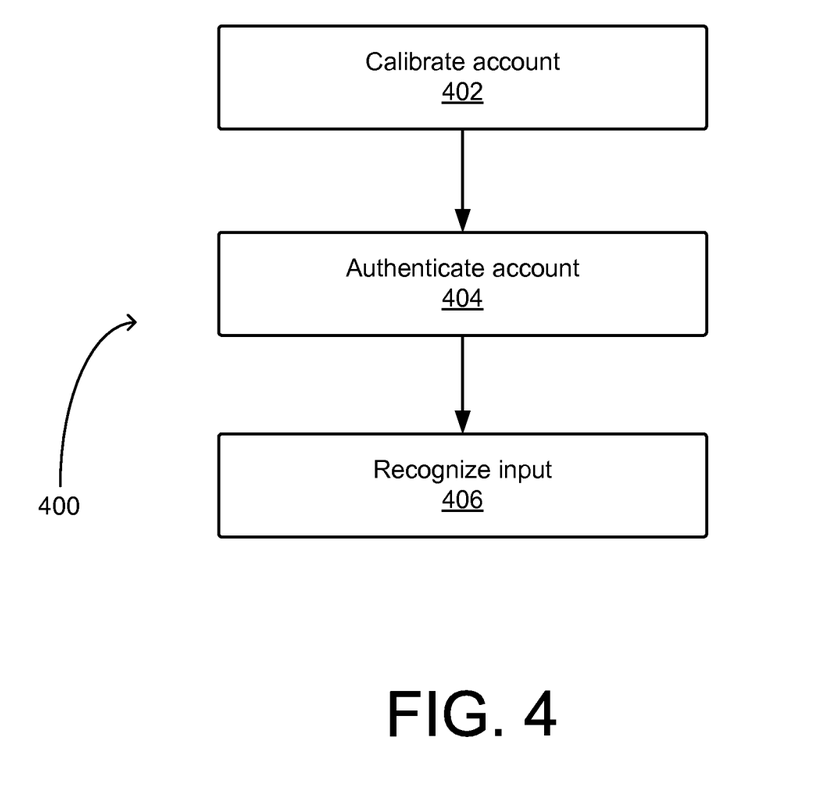
FIG. 4 is a flowchart showing a method according to an example implementation.

FIG. 4 is a flowchart showing a method 400 according to an example implementation. According to this example, the method 400 may include calibrating an account for input from a touch keyboard 106 (402). In an example implementation, the touch keyboard 106 may include a flat display. The calibrating may include storing locations and pressures of contacts onto the touch keyboard for expected inputs. Calibrating the account (402) may include presenting text for the expected inputs. The calibration engine 202 may calibrate the touch keyboard 106 (402) by, for example, instructing the computing device 104 to present sample text to the user, listening for and/or detecting contact inputs, and storing input units 214 based on the presented text and received inputs. Calibrating the account (402) may include storing locations and pressures of contacts for each of multiple characters, the multiple characters corresponding to the expected inputs.

The calibrating the account (402) may include determining a minimum pressure threshold for each of a plurality of characters, each minimum threshold being based on multiple contacts and pressures associated with the character. The calibration engine 202 may also determine which contact inputs represented keyboard entries and which were accidental contacts. For contacts associated with a same key or character, the calibration engine 202 may determine a pressure threshold 220 based on a lowest pressure of all the contacts, may discard a fraction of the contacts with lower pressures or force, or may discard outliers based on a calculated standard deviation, according to example implementations.

The method 400 may also include authenticating an account based on received login information (404). Recognizing the account (404) may include receiving login information, such as a name and authentication information, such as a username and password associated with the account. Recognizing the account (404) may include loading a set of input units 214 associated with the account, with which the input processor will determine whether to recognize contact inputs.

The method 400 may also include recognizing inputs from the touch keyboard 106 based on comparing received locations and pressures of contacts onto the touch keyboard to the stored locations and pressures of contacts (406). The inputs may be recognized during a session with an account. During the session, the set of input units 214 associated with the account may have been loaded. The recognizing inputs (406) may include the receiver 224 of the input processor 222 receiving contact inputs, including location on the touch keyboard 106 and force or pressure, representing contacts on the touch keyboard 106. The recognizing inputs (406) may also include the comparator 226 comparing the pressure or force of the contact inputs to the pressure threshold 220 of the input unit 214 with a location 218 matching or including the location of the contact input. If the pressure or force of the contact input meets or exceeds the pressure threshold 220, the input processor 222 may recognize the key 216 associated with the location 218 of the contact input.

The method 400 may also include ignoring input from the touch keyboard based on comparing locations and pressures of contacts onto the touch keyboard to the calibrated account. If the pressure or force of the contact input does not meet or exceed the pressure threshold 220, the input processor 222 may discard and/or ignore the contact input.

Figure 5:
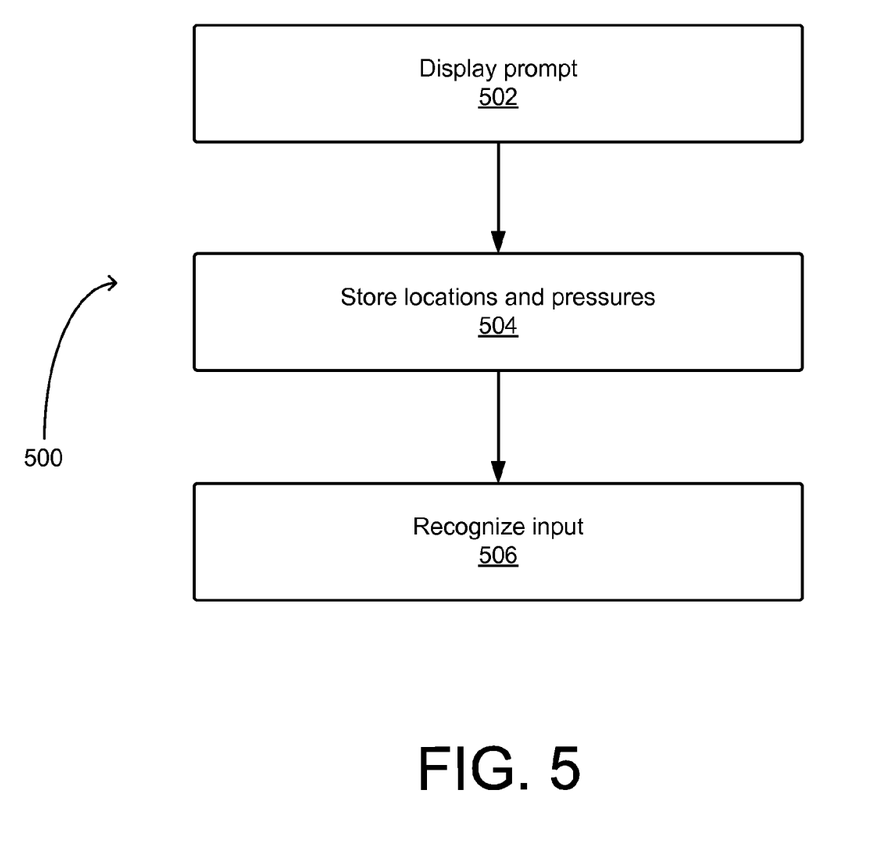
FIG. 5 is a flowchart showing another method according to an example implementation.

FIG. 5 is a flowchart showing another method 500 according to an example implementation. The method 500 may include displaying a prompt to type into the touch keyboard (502). The method 500 may also include storing locations and pressures of calibration inputs onto keys on the touch keyboard in association with an account (504). The method 500 may also include recognizing subsequent inputs into the touch keyboard during a session with the account based on the stored locations and pressures (506).

According to an example implementation, the touch keyboard 106 may include a display that displays the keys.

According to an example implementation, the touch keyboard 106 may include a resistive touch keyboard that monitors locations and pressures of inputs and/or contacts.

According to an example implementation, the touch keyboard 106 may include a standalone touch keyboard configured to transmit keyboard input signals to a general purpose computing system.

According to an example implementation, the touch keyboard 106 may include a standalone touch keyboard configured to wirelessly transmit keyboard input signals to a general purpose computing system, such as the computing device 104.

According to an example implementation, the touch keyboard 106 may include a standalone touch keyboard configured to display the keys and display the prompt. The server 102 may include a remote server configured to store the locations and pressures of the calibration inputs and recognize the subsequent inputs.

According to an example implementation, the recognizing (506) may include receiving a login associated with the account and retrieving stored locations and pressures associated with the account.

According to an example implementation, the recognizing (506) may include comparing locations and pressures of typing inputs with the stored locations and pressures of calibration inputs associated with the account.

According to an example implementation, the method 500 may further include ignoring an input to a predetermined location based on a pressure of the input being less than a threshold for the predetermined location, the threshold for the predetermined location being higher than thresholds for other locations on the touch keyboard.

According to an example implementation, the method 500 may further include storing locations and pressures of a second set of calibration inputs onto the keys on the touch keyboard in association with a second account, and recognizing subsequent inputs during a session with the second account based on the second set of stored locations and pressures.

According to an example implementation, the method 500 may further include recognizing subsequent inputs into a second touch keyboard during a second session with the account based on the stored locations and pressures.

According to an example implementation, the method 500 may further include determining a pressure threshold for each of the keys based on the stored locations and pressures.

Figure 6:
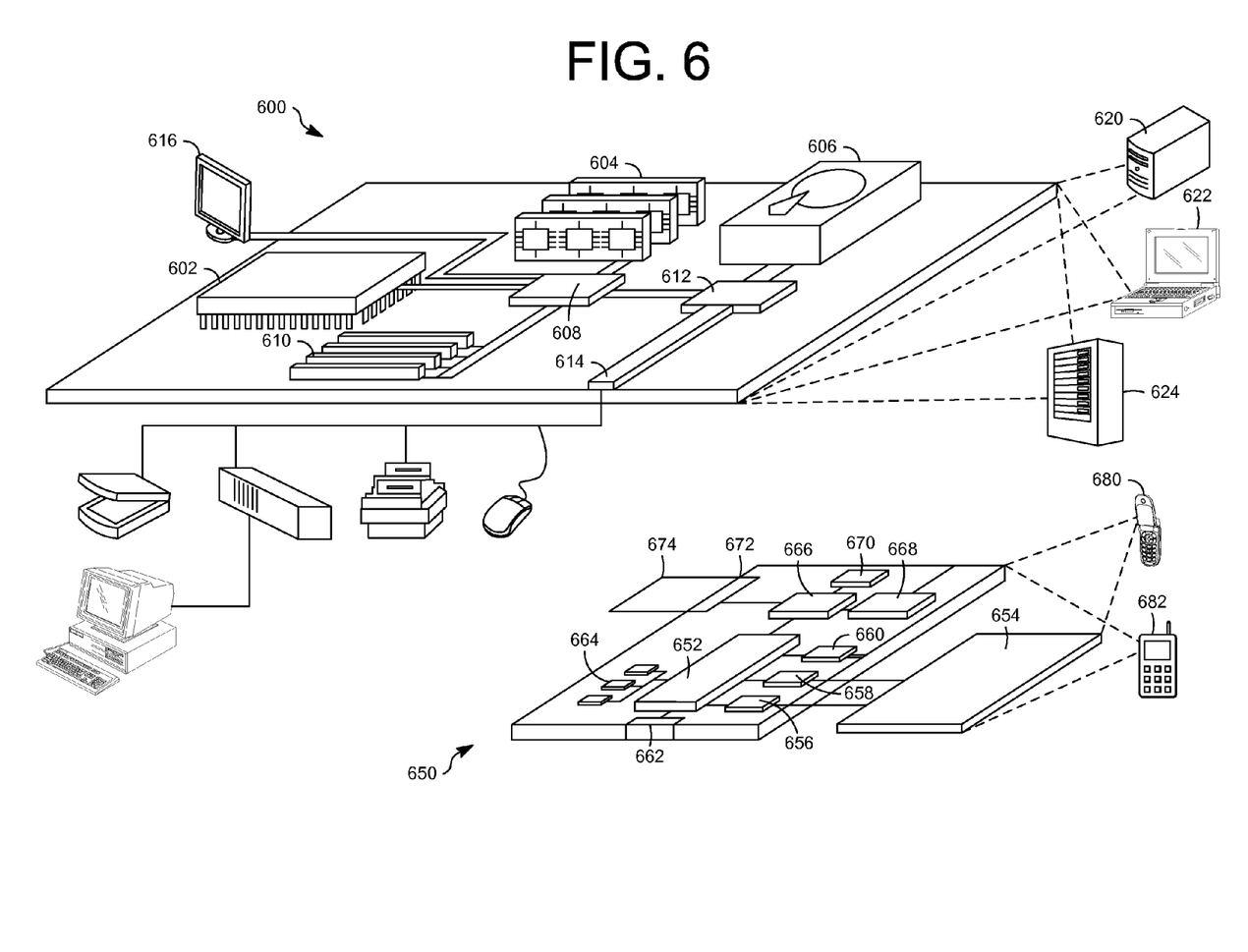
FIG. 6 shows an example of a computer device and a mobile computer device that can be used to implement the techniques described here.

FIG. 6 shows an example of a generic computer device 600 and a generic mobile computer device 650, which may be used with the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or other similar mobile device.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A non-transitory computer-readable storage medium comprising instructions stored thereon that, when executed by at least one processor, are configured to cause a computing system to at least:
    display a prompt to type into a touch keyboard;
    store locations and pressures of calibration inputs onto keys on the touch keyboard in association with an account; and
    recognize subsequent inputs into the touch keyboard during a session with the account based on the stored locations and pressures.

2. The non-transitory computer-readable storage medium of claim 1, wherein the touch keyboard comprises a display that displays the keys.

3. The non-transitory computer-readable storage medium of claim 1, wherein the touch keyboard comprises a resistive touch keyboard that monitors locations and pressures of inputs.

4. The non-transitory computer-readable storage medium of claim 1, wherein the touch keyboard comprises a standalone touch keyboard configured to transmit keyboard input signals to a general purpose computing system.

5. The non-transitory computer-readable storage medium of claim 1, wherein the touch keyboard comprises a standalone touch keyboard configured to wirelessly transmit keyboard input signals to a general purpose computing system.

6. The non-transitory computer-readable storage medium of claim 1, wherein the computing system comprises at least:
   a standalone touch keyboard configured to display the keys and display the prompt; and
   a remote server configured to store the locations and pressures of the calibration inputs and recognize the subsequent inputs.

7. The non-transitory computer-readable storage medium of claim 1, wherein the recognizing includes receiving a login associated with the account and retrieving stored locations and pressures associated with the account.

8. The non-transitory computer-readable storage medium of claim 1, wherein the recognizing includes comparing locations and pressures of typing inputs with the stored locations and pressures of calibration inputs associated with the account.

9. The non-transitory computer-readable storage medium of claim 1, wherein the instructions are further configured to cause the computing system to ignore an input to a predetermined location based on a pressure of the input being less than a threshold for the predetermined location, the threshold for the predetermined location being higher than thresholds for other locations on the touch keyboard.

10. The non-transitory computer-readable storage medium of claim 1, wherein the instructions are further configured to cause the computing system to:
    store locations and pressures of a second set of calibration inputs onto the keys on the touch keyboard in association with a second account; and
    recognize subsequent inputs during a session with the second account based on the second set of stored locations and pressures.

11. The non-transitory computer-readable storage medium of claim 1, wherein the instructions are further configured to cause the computing system to recognize subsequent inputs into a second touch keyboard during a second session with the account based on the stored locations and pressures.

12. The non-transitory computer-readable storage medium of claim 1, further comprising determining a pressure threshold for each of the keys based on the stored locations and pressures.

13. A non-transitory computer-readable storage medium comprising instructions stored thereon that, when executed by at least one processor, are configured to cause a computing system to at least:
    authenticate a login associated with an account;
    display keys on a touch keyboard, the touch keyboard comprising a flat display and being configured to detect locations and pressures of contacts onto the flat display;
    display text on a display for a user of the account to type into the touch keyboard;
    store locations and pressures of contacts onto the touch keyboard for expected inputs, the expected inputs being based on the displayed text;
    determine minimum pressure thresholds and locations for multiple characters, the minimum pressure thresholds and locations being based on the stored locations and pressures;
    compare, during a session with the account, at least a first input from the touch keyboard to a first pressure threshold associated with a first character and a second input from the touch keyboard to a second pressure threshold associated with a second character;
    recognize the first character based on the first input meeting the first pressure threshold; and
    ignore the second input based on the second input not meeting the second pressure threshold.

14. The non-transitory computer-readable storage medium of claim 13, wherein the system includes a server coupled to a computing device receiving input from the touch keyboard.

15. A computing device comprising:
    a touch screen configured to display text and receive touch inputs;
    at least one processor; and
    a non-transitory computer-readable storage medium comprising instructions stored thereon that, when executed by at least one processor, are configured to cause the computing device to at least:
    display keys on the touch screen;
    display a prompt to type into the touch screen;
    store locations and pressures of inputs onto the keys on the touch screen; and
    recognize subsequent inputs into the touch screen based on the stored locations and pressures.

16. The computing device of claim 15, wherein the touch screen comprises a resistive touch screen that monitors locations and pressures of inputs.

17. The computing device of claim 15, wherein:
    the storing locations and pressures includes storing the locations and pressures of calibration inputs in association with an account; and
    the recognizing includes receiving a login associated with the account and retrieving stored locations and pressures associated with the account.

18. The computing device of claim 15, wherein the recognizing includes comparing locations and pressures of typing inputs with the stored locations and pressures of the inputs.

19. The computing device of claim 15, wherein the instructions are further configured to cause the computing device to ignore an input to a predetermined location based on a pressure of the input being less than a threshold for the predetermined location, the threshold for the predetermined location being higher than thresholds for other locations on the touch screen.

20. The computing device of claim 15, wherein the instructions are further configured to cause the computing device to determine a pressure threshold for each of the keys based on the stored locations and pressures.

* * * * *